US012072943B2

(12) United States Patent
Galuten

(10) Patent No.: US 12,072,943 B2
(45) Date of Patent: Aug. 27, 2024

(54) MARKING FALSITIES IN ONLINE NEWS

(71) Applicant: SONY INTERACTIVE ENTERTAINMENT LLC, San Mateo, CA (US)

(72) Inventor: Albhy Galuten, Santa Monica, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/943,668

(22) Filed: Jul. 30, 2020

(65) Prior Publication Data

US 2020/0356615 A1    Nov. 12, 2020

Related U.S. Application Data

(62) Division of application No. 15/901,740, filed on Feb. 21, 2018, now abandoned.

(Continued)

(51) Int. Cl.
*G06F 16/9535*     (2019.01)
*G06F 16/2457*     (2019.01)
(Continued)

(52) U.S. Cl.
CPC .... *G06F 16/9535* (2019.01); *G06F 16/24578* (2019.01); *G06F 16/248* (2019.01);
(Continued)

(58) Field of Classification Search
CPC ........... G06F 16/9535; G06F 16/24578; G06F 16/248; G06F 16/337; G06F 16/95; G06Q 10/0639; G06Q 10/10; G06Q 30/018
See application file for complete search history.

(56) References Cited

U.S. PATENT DOCUMENTS 8,856,165 B1    10/2014   Ciemiak
9,285,973 B1 *   3/2016   Gable ................ G06Q 30/0282
(Continued)

FOREIGN PATENT DOCUMENTS

CN     104572807      4/2015
CN     104636408      5/2015
(Continued)

OTHER PUBLICATIONS

Resnick et al., Paul; "Iffy Quotient: A Platform Health Metric For Misinformation", School of Information Center for Social Media Responsibility, University of Michigan. Oct. 10, 2018.

(Continued)

*Primary Examiner* — Cam Y T Truong
(74) *Attorney, Agent, or Firm* — Polsinelli LLP

(57) ABSTRACT

Systems and methods for determining news veracity are provided. Information may be stored in memory regarding a plurality of media outlets, a plurality of journalists, and a plurality of predefined topics. News content may be received over a communication network. The received news content may be evaluated to identify an associated media outlet, an associated journalist, and at least one associated predefined topic. A current score for each of the associated media outlet, the associated journalist, and the at least one associated predefined topic may be identified based on the stored information. A veracity score may be scored based on the identified current scores for the associated media outlet, the associated journalist, and the at least one associated predefined topic. A display associated with the received news content may be modified based on the generated veracity score.

33 Claims, 8 Drawing Sheets

Related U.S. Application Data

(60) Provisional application No. 62/461,714, filed on Feb. 21, 2017.

(51) Int. Cl.
*G06F 16/248* (2019.01)
*G06F 16/335* (2019.01)
*G06Q 10/0639* (2023.01)
*G06Q 10/10* (2023.01)
*G06Q 30/018* (2023.01)

(52) U.S. Cl.
CPC ....... *G06F 16/337* (2019.01); *G06Q 10/0639* (2013.01); *G06Q 10/10* (2013.01); *G06Q 30/018* (2013.01)

(56) References Cited

U.S. PATENT DOCUMENTS

| | | | |
|---|---|---|---|
| 2005/0060312 A1* | 3/2005 | Curtiss | G06F 16/24578 |
| 2008/0005095 A1 | 1/2008 | Horvitz et al. | |
| 2009/0157490 A1 | 6/2009 | Lawyer | |
| 2009/0265304 A1 | 10/2009 | Ait-Mokhtar et al. | |
| 2009/0271430 A1* | 10/2009 | Bird | G06F 16/24573 |
| | | | 707/999.102 |
| 2010/0268776 A1* | 10/2010 | Gerke | G06Q 10/10 |
| | | | 709/204 |
| 2011/0082757 A1* | 4/2011 | Bullock | G06Q 30/0601 |
| | | | 705/37 |
| 2011/0270670 A1* | 11/2011 | Leathern | G06Q 30/0273 |
| | | | 705/14.69 |
| 2012/0078826 A1* | 3/2012 | Ferrucci | G06N 7/005 |
| | | | 706/12 |
| 2012/0089617 A1* | 4/2012 | Frey | G06F 16/951 |
| | | | 707/E17.084 |
| 2013/0151240 A1* | 6/2013 | Myslinski | G06F 40/00 |
| | | | 704/9 |
| 2013/0159127 A1* | 6/2013 | Myslinski | G06Q 30/00 |
| | | | 705/26.1 |
| 2013/0198196 A1 | 8/2013 | Myslinski | |
| 2013/0218788 A1 | 8/2013 | Terheggen | |
| 2014/0074547 A1* | 3/2014 | B'Far | G06Q 10/105 |
| | | | 705/7.28 |
| 2014/0164994 A1 | 6/2014 | Myslinski | |
| 2014/0201215 A1 | 7/2014 | Benner et al. | |
| 2014/0331119 A1 | 11/2014 | Dixon et al. | |
| 2014/0365571 A1 | 12/2014 | Agarwal et al. | |
| 2015/0019565 A1* | 1/2015 | Lijachev | G06F 16/24578 |
| | | | 707/748 |
| 2015/0066958 A1* | 3/2015 | Krusell | G06Q 30/0204 |
| | | | 707/749 |
| 2015/0193386 A1* | 7/2015 | Wurtz | G06F 40/109 |
| | | | 715/269 |
| 2015/0248736 A1* | 9/2015 | Myslinski | G06F 3/0488 |
| | | | 705/319 |
| 2015/0293897 A1* | 10/2015 | Myslinski | G06Q 10/06 |
| | | | 707/755 |
| 2016/0036833 A1* | 2/2016 | Ardeli | H04L 63/1408 |
| | | | 726/22 |
| 2016/0055164 A1 | 2/2016 | Cantarero et al. | |
| 2016/0162512 A1* | 6/2016 | Battistini | G06F 16/29 |
| | | | 707/804 |
| 2016/0232241 A1* | 8/2016 | Stoyanov | G06F 16/9535 |
| 2016/0239496 A1 | 8/2016 | Motte et al. | |
| 2016/0328453 A1 | 11/2016 | Galuten | |
| 2016/0328482 A1* | 11/2016 | Shah | G06Q 50/01 |
| 2017/0060945 A1 | 3/2017 | Bastide et al. | |
| 2017/0132315 A1* | 5/2017 | Lisa | G06F 3/04817 |
| 2017/0140052 A1 | 5/2017 | Bufe et al. | |
| 2017/0177717 A1 | 6/2017 | Raniere | |
| 2017/0323019 A1* | 11/2017 | Hall | G06Q 30/018 |
| 2018/0032526 A1* | 2/2018 | Cudak | H04M 3/42042 |
| 2018/0046628 A1* | 2/2018 | Wang | G06Q 50/01 |
| 2018/0052911 A1* | 2/2018 | Allen | G06F 16/337 |
| 2018/0077146 A1* | 3/2018 | Lonas | B66B 7/023 |
| 2018/0143980 A1* | 5/2018 | Tanikella | G06F 16/285 |
| 2018/0239832 A1 | 8/2018 | Galuten | |
| 2020/0202071 A1* | 6/2020 | Ghulati | G06Q 50/01 |

FOREIGN PATENT DOCUMENTS

| | | |
|---|---|---|
| CN | 105447036 | 3/2016 |
| CN | 110537176 | 12/2019 |
| EP | 3586251 | 1/2020 |
| JP | 10-171819 | 6/1998 |
| JP | 2005-122556 | 5/2005 |
| JP | 2016-099685 | 5/2016 |
| JP | 6835978 | 2/2021 |
| JP | 2021-073621 | 5/2021 |
| JP | 7206304 | 1/2023 |
| WO | WO 2013/105404 | 7/2013 |
| WO | WO 2018/156641 | 8/2018 |

OTHER PUBLICATIONS

PCT Application No. PCT/US2018/019034 International Preliminary Report On Patentability dated Aug. 27, 2019.
PCT Application No. PCT/US2018/019034 International Search Report and Written Opinion dated Apr. 25, 2018.
European Application No. 18758401.6; Extended European Search Report dated Aug. 11, 2020.
Japanese Application No. 2019-545287; Non-Final Notification of Reasons for Refusal dated Jun. 30, 2020.
U.S. Appl. No. 15/901,740 Non-Final Office Action mailed Dec. 24, 2020.
U.S. Appl. No. 15/901,740 Final Office Action mailed Jul. 28, 2021.
Japanese Application No. 2021-016629; Non-Final Notification of Reasons for Refusal dated May 17, 2022.
Chinese Application No. 201880013012.4; Second Office Action dated Feb. 23, 2023.
Chinese Application No. 201880013012.4; First Office Action dated Sep. 26, 2022.
Chinese Application No. 201880013012.4; Search Report dated Sep. 26, 2022.
Chinese Application No. 201880013012.4; Fourth Office Action dated Mar. 26, 2024.
Chinese Application No. 201880013012.4; Third Office Action dated Nov. 28, 2023.
Chinese Application No. 201880013012.4; Decision of Rejection dated Jun. 13, 2023.

* cited by examiner

Figure 1 Architecture Overview

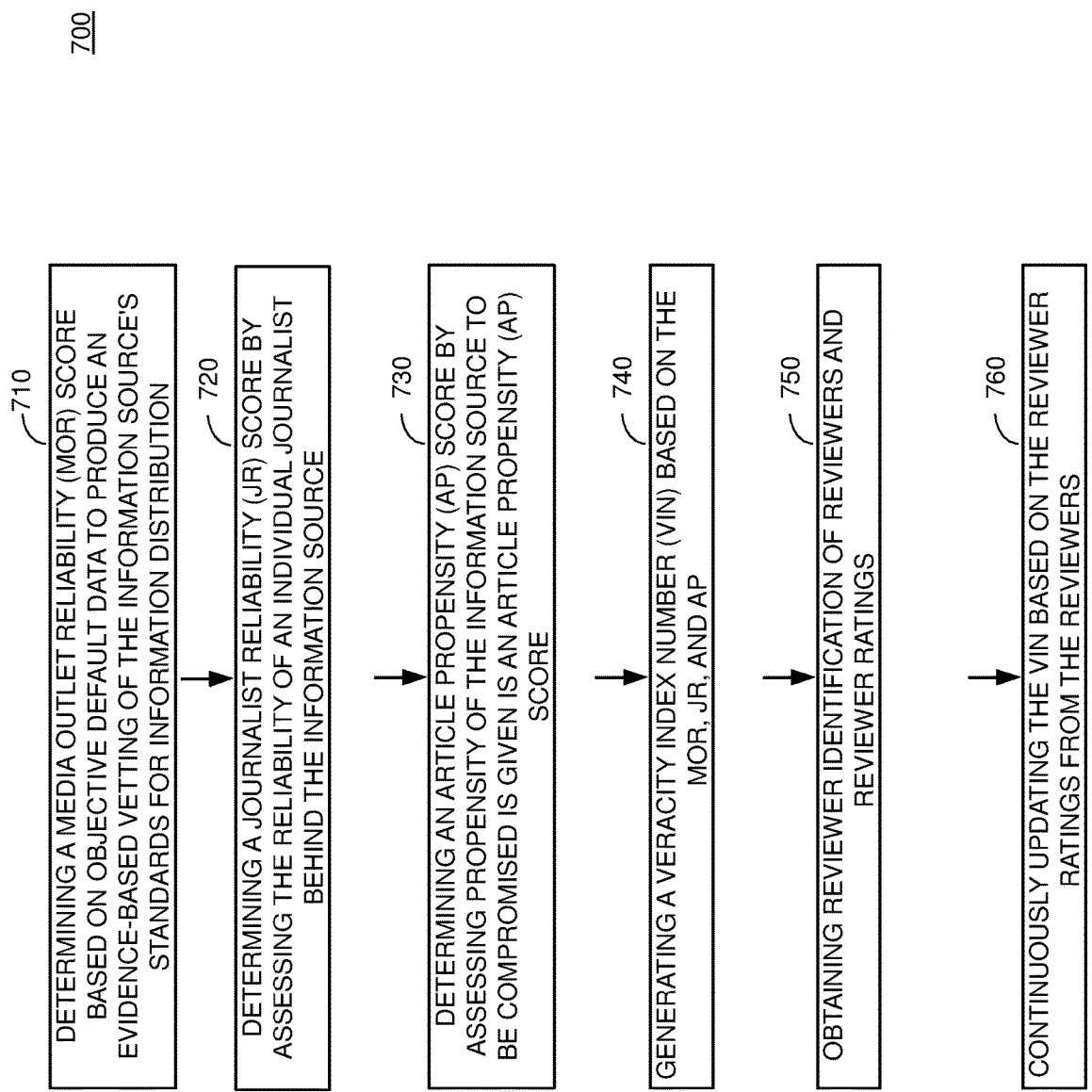

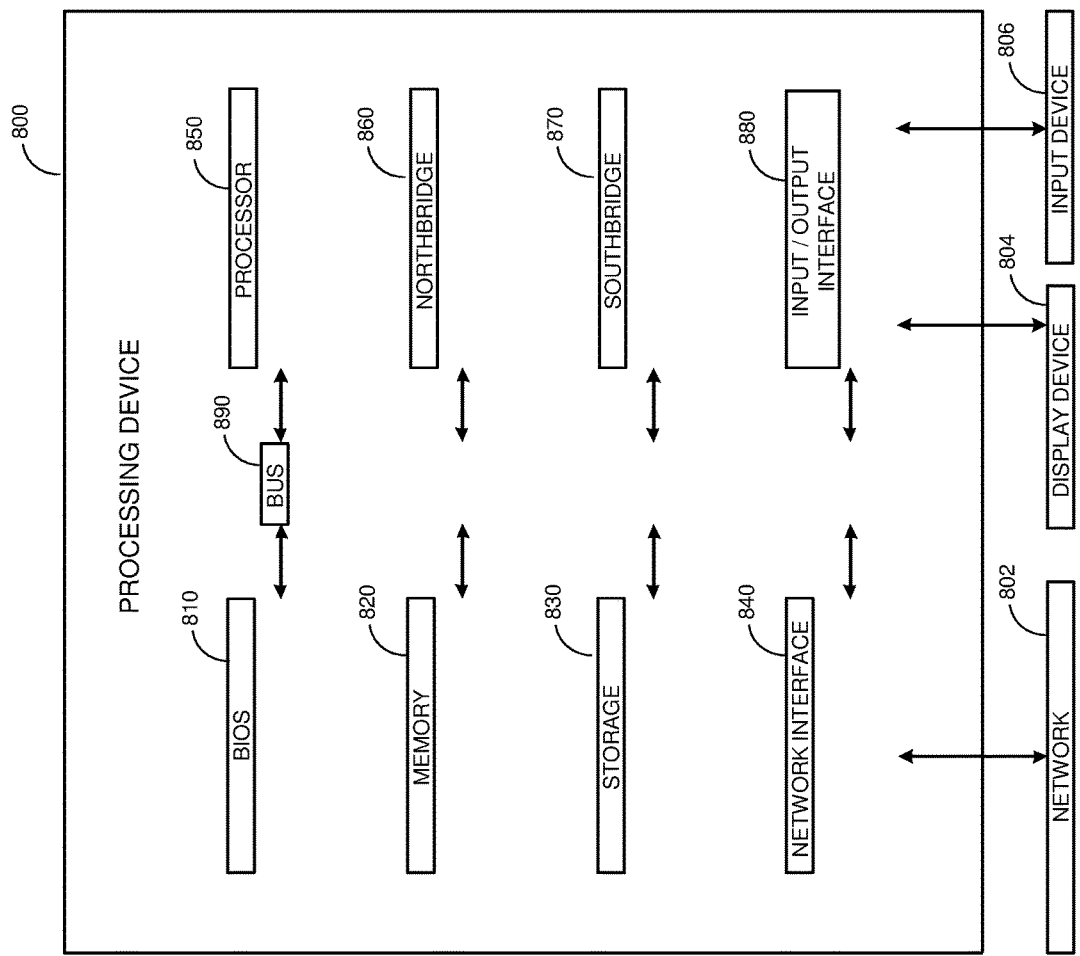

MARKING FALSITIES IN ONLINE NEWS

CROSS-REFERENCE TO RELATED APPLICATIONS

The present application is a division of U.S. patent application Ser. No. 15/901,740 filed Feb. 21, 2018, which claims the priority benefit of U.S. provisional patent application 62/461,714 filed Feb. 21, 2017, the disclosures of which are incorporated by reference herein.

BACKGROUND OF THE INVENTION

Field of the Invention

This application relates to news media, and more particularly to a system and method for resolving news veracity of an information source.

Description of the Related Art

The news today is no longer provided by the morning paper or the nightly TV news but rather in an electronic news feed curated by algorithms designed to optimize advertising revenue while they entertain, disgust, delight, outrage, titillate, or horrify. Sensationalist stories dominate space at the checkout counter. Now it is very hard to tell the real from the fabricated.

Today, people review the work of others in a few areas. Angie's list applies to workers in the home improvement trade. Trip Advisor applies to the quality of lodging and other locations and services tourists typically use. Facebook uses a "thumbs-up" and "thumbs-down" approach to liking things or not. None of these systems integrate a holistic approach to the multiple axes that can combine to create a more robust form of reputation grading.

The current news stream is highly populated by stories of fake news. It is imperative that consumers and other journalists have a mechanism to determine the veracity of media. Efforts are underway by the likes of Google and Facebook to combat that, but current efforts do not scale.

The technical difficulties in evaluating a likelihood of veracity are manifold. One difficulty is evaluating the source, in terms of both the media outlet and the individual journalist generating the content. Currently, the only way to evaluate a source is for an individual to consume numerous items of content from both the media outlet and the individual journalist over time and come to a subjective opinion of the reputation of the source and therefore, the likely veracity of content from that source. And to do so, the individual must either have their own expertise in the subjects being reported on or act as a fact-checker for each fact presented. Such difficulties are exacerbated, as the likelihood of veracity associated with each media outlet and journalist is not static and may change over time as quality increases or declines, biases of owners or advertisers affect coverage, and certain topics may be difficult to cover in terms of complexity, availability of evidence, and subjectivity involved.

Another difficulty is that some news content may truthfully report on statements made by certain individuals who may be lying. For example, a government official may (falsely) state that the earth is flat, and a newspaper may report that such statement was made. While it is true that the statement was made, such reporting may nevertheless be misleading if not put into context by an equally prominent placement of the fact that the earth is, in fact, not flat but round. Such incomplete and misleading reporting may likewise require either personal knowledge/expertise or willingness to fact-check in order to identify.

Such difficulties are further exacerbated by the unavailability of any way to quickly evaluate in quantitative as well as qualitative terms and communicate the likely veracity of news content in real-time or near real-time. Meanwhile, "[a] lie can travel halfway around the world while the truth is still putting on its shoes"—a quote generally (but erroneously) attributed to Mark Twain. In light of modern-day virality of content, falsities and fiction may quickly permeate the public sphere, which is mostly comprised of people who lack both the expertise and the time/resources to fact-check the news content they consume. Even those few who do not lack expertise or do have the time/resources may not be able to correct such falsities or misconceptions to the same degree that the falsity has spread. There is, therefore, a need in the art for improved systems and methods of determining news veracity.

SUMMARY OF THE PRESENTLY CLAIMED INVENTION

A media system for resolving news veracity of an information source. Systems and methods for determining news veracity are provided. Information may be stored in memory regarding a plurality of media outlets, a plurality of journalists, and a plurality of predefined topics. News content may be received over a communication network. The received news content may be evaluated to identify an associated media outlet, an associated journalist, and at least one associated predefined topic. A current score for each of the associated media outlet, the associated journalist, and the at least one associated predefined topic may be identified based on the stored information. A veracity score may be scored based on the identified current scores for the associated media outlet, the associated journalist, and the at least one associated predefined topic. A display associated with the received news content may be modified based on the generated veracity score.

In one embodiment, a system for determining veracity of a news article includes a database in memory that stores information regarding media outlets, journalists, and predefined topics. A processor executes instructions stored in memory to evaluate received news content to identify an associated media outlet, an associated journalist, and an associated predefined topic. Execution of the instructions by the processor also identifies a current score for each of the media outlet, the journalist, and the predefined topic. A veracity score is then generated based on the identified current scores. A display in then modified to show received news content based on the generated veracity score.

In a second embodiment, a method for determining veracity of a news article is claimed. Information is stored in memory regarding media outlets, journalists, and predefined topics. News content is received and evaluated to identify an associated media outlet, an associated journalist, and an associated predefined topic. A current score for each of the media outlet, journalist, and predefined topic based is determined followed by generation of a veracity score based on the identified current scores for the media outlet, associated journalist, and predefined topic. A display is then modified with respect to the received news content based on the generated veracity score.

A third claimed embodiment involves a non-transitory computer readable storage medium. Said medium stores instructions that may be executed by a processing device.

Through execution of the instructions, information is stored in memory regarding media outlets, journalists, and predefined topics. News content is received and evaluated to identify an associated media outlet, an associated journalist, and an associated predefined topic. A current score for each of the media outlet, journalist, and predefined topic based is determined followed by generation of a veracity score based on the identified current scores for the media outlet, associated journalist, and predefined topic. A display is then modified with respect to the received news content based on the generated veracity score.

BRIEF DESCRIPTION OF THE DRAWINGS

FIG. 7 illustrates an example methodology for determining news veracity;

and

Figure 1:
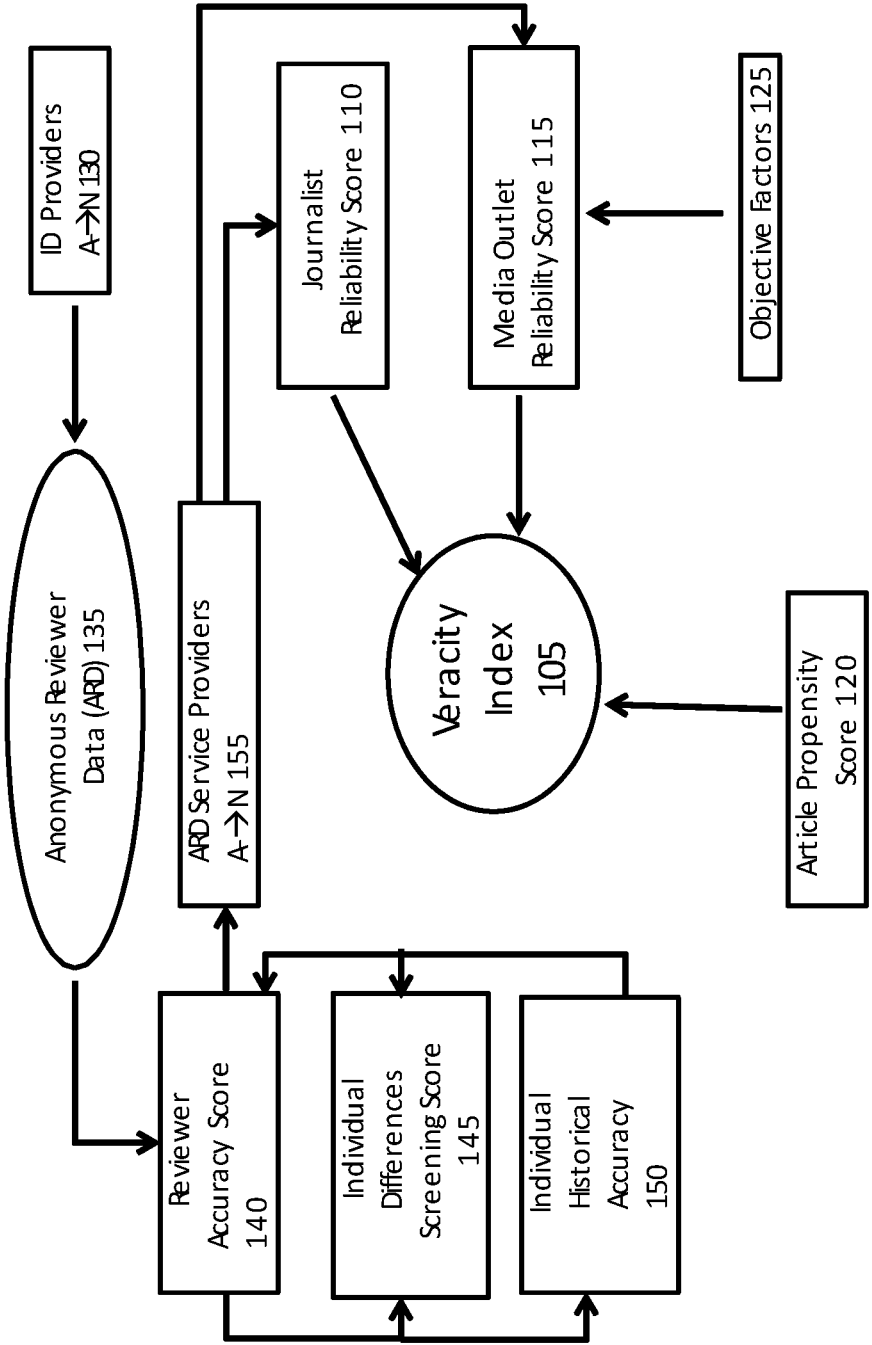
FIG. 1 illustrates a block diagram of an example architecture for determining news veracity of an information source, according to one implementation of the invention.

FIG. 8 illustrates a block diagram of an example processing device.

DETAILED DESCRIPTION

Embodiments of the present invention provide systems and methods for determining news veracity in a quantifiable way that allows for numerical analysis. Such determinations of news veracity may rely on combinations of natural language processing, artificial intelligence/machine learning, and recursive application of the evolving learning dataset. As such, what was formerly a subjective exercise in forming opinions based on generalized perceptions of reputation may be replaced by an automated system for objectively quantifying the likelihood of veracity based on specified factors and for visually indicating such quantified identifications on computing device displays in real-time or close to real-time. Because such visual indicators communicate the granular information about potentially false or fictional representations made available by behavior-based quantified scores, systems can identify previously unknown falsehoods or fictions, as well as known falsehoods or fictions, whether disguised or not. Such a score-based approach also enables more flexible and nuanced filtering for potentially false or fictional representation by employing a new kind of analytical tool that enables security systems to do things that were previously not available or possible. Moreover, such filtering may be tailored for different users and ensures that false or fictional content is identified and visually flagged as such before any (further) dissemination to the unwitting public.

Information may be stored in memory regarding a plurality of media outlets, a plurality of journalists, and a plurality of predefined topics. News content may be received over a communication network. The received news content may be evaluated to identify an associated media outlet, an associated journalist, and at least one associated predefined topic. A current score for each of the associated media outlet, the associated journalist, and the at least one associated predefined topic may be identified based on the stored information. A veracity score may be scored based on the identified current scores for the associated media outlet, the associated journalist, and the at least one associated predefined topic. A display associated with the received news content may be modified based on the generated veracity score.

The subject disclosure provides devices and techniques for resolving news veracity of an information source. Various embodiments of the present technology are described with reference to the drawings. In the following description, for purposes of explanation, numerous specific details are set forth in order to provide a thorough understanding of one or more embodiments. It can be evident, however, that the present technology can be practiced without these specific details. In other instances, well-known structures and devices are shown in block diagram form in order to facilitate describing these embodiments. The word "exemplary" is used herein to mean "serving as an example, instance, or illustration." Any embodiment described herein as "exemplary" is not necessarily to be construed as preferred or advantageous over other embodiments.

The present disclosure relates to determining the veracity of a story, journalist, or publication, at least in part based on a nuanced version of the wisdom of the crowds. That is, members of the public can rate the veracity of each article but the weight of each rating depends on the expected and historical accuracy of that particular reviewer within the field of the article. Specifically, various persons can ascribe a perceived veracity score for any article, journalist, or publication. The veracity score is weighted based on the imputed and historical data around the particular reviewer's accuracy in regard to that particular article, journalist or publication.

The veracity score is married with other data about the article, journalist or publication to create a Veracity Index Number (VIN) which can be used by publications, web sites or internet browsers to indicate to consumers the veracity of a particular article, journalist, or publication.

This represents a multi-faceted approach based on artificial intelligence (AI) and various social and psychological factors to generate a veracity score that can be updated continuously based on historical performance of the reviewers, journalists and periodicals.

FIG. 1 illustrates a block diagram 100 of an example architecture for resolving news veracity of an information source, according to one implementation of the invention. In order to judge the veracity of the information the system receives, the method includes a multi-part process that involves scoring the reliability of the information being examined, as well as a dynamic and ongoing performance accountability mechanism, which aims to forensically and technically evaluate the scoring mechanism to ensure that it is constantly being updated to reflect changes in the information landscape.

As an initial matter, news content should be understood to refer to any type of publication, including printed or digital text, images, video, and other media presented as factual reports. The publications may appear not only in traditional media outlets, but may also be published or republished in wire services, online and social media outlets, blogs, and microblogs. Each item of news content may therefore be associated with certain characteristics that may be tracked and analyzed, including associated media outlet that (re)

published, associated journalist(s) that contributed, predefined topic(s), other parties that shared the item, predefined topic categories, links and other digital metadata, hash values and other digital signatures, keywords or images present within the item, and other characteristics known in the art for evaluating print and digital content.

Natural language processing techniques may be applied to the item to discern certain meanings of statements made within the news content item as well. Certain statements—e.g., "war is peace," "freedom is slavery," and "ignorance is strength"—may be tracked and identified as common falsities known to be promulgated in certain types of viral content. As artificial intelligence techniques are also applied, the learning set may be expanded and refined so as to allow for recognition of such falsities even when alterations or synonyms are used in attempts to circumvent the detection of obvious falsities.

Further combinations of natural language processing and artificial intelligence may further be able to identify rhetorical devices that may obfuscate and camouflage attempts to communicate such falsities in different ways. For example, the statement—"guns don't kill people; people kill people"—is a rhetorical device often used by gun control opponents to deflect from the fact that gunshot wounds (which can only be inflicted by guns) do, in fact, kill many people. Under embodiments of the present invention, the first part of such statement may therefore be associated with an indicator of likely falsity, certain display modifications (e.g., deleting, editing, highlighting, minimization in color or size, moving to a footnote), and additional context regarding actual statistics of deaths resulting from gunshot wounds, as well as comparisons to numbers of deaths resulting from other causes (e.g., fisticuffs, knives). For forms of media such as video, corresponding modifications may be applied. For example, after an individual in the video makes a false statement, the video may be paused to play inserted machine-generated content (e.g., video, audio, scrolling text) that identifies the likelihood of falsity and provides any appropriate context to correct any falsity.

Faked images may also be digitally altered to represent falsities. Such images may likewise be analyzed and tracked based on similar characteristics as discussed above. Presently available image recognition and analytical tools may be used to identify a source of an image, whether an image has been tampered with, and to provide indications of likelihood of veracity. Certain images may be designated as fictional, for example (e.g., images from fictional books, television shows, or movies), and signatures related to such images are therefore an indication of low likelihood of veracity.

Further, to establish the reliability of a news item, the system generates a Veracity Index Number (VIN). This number is generated by factoring at least three key variables that matter most in judging veracity, the first being the reliability of the source providing the news item, and the second being the reliability of the individual journalist and the third being the propensity of the item's content to be compromised. The VIN may be adjusted over time with greater weight be given, for example, to more recent variables. As VIN may therefore indicate likelihood of being true or reliable, certain ranges may reflect high likelihood of being true, moderate likelihood of being true, neutral, moderate likelihood of being false, and high likelihood of being false. In some embodiments, automated systems may be provided to visually indicate the VIN range of certain content. As such, a content consumer may see at a glance before consuming a content item, an overall likelihood that the content is true or false, as well as relative likelihoods of each statement made within the content Further, outlets that allow for republication or linking of content (e.g., social media, Facebook, Twitter) may allow for such visual indications to be applied to such reposting. Such visual indicators may include an overall veracity score or indicator, or may be more granular (e.g., where certain sections, paragraphs, or lines may be highlighted as particularly likely to be true or false). For outlets where republication or linking is allowed, there may further be a score generated for the account that shared the content with a high likelihood of being false, especially without expressly and prominently stating that such content is highly likely to be false. While there may be some public interest in the fact that a news report was released that is highly likely to be false (e.g., where the news report is published by an outlet controlled by and acting as an arm of a government or corporate entity), it may nevertheless be deceptive or misleading to certain audiences who consume such content without the context that the presently disclosed scores and veracity indicators provide.

In some embodiments, a social media user may be provided with tools to automatically filter through such content so that content with a high likelihood of being false/fiction does not appear on one's timeline, or where such content may have false statements deleted, minimized, annotated with the truth or complete context, or otherwise modified within the display to indicate that such statements are likely to be false/fictional and what may be missing so as to provide full context. Questionable statements (e.g., statements identified as being moderately likely to be false) may also be marked as such. The specific types of annotations or modifications, etc., may be based on user preferences, the type of device used to access such content, the specific website or media channel, and other factors.

The reliability of the source providing the news item is given a Media Outlet Reliability (MOR) Score. To obtain the MOR score, objective default data are combined to produce an evidence-based vetting of the information source's standards for information distribution. These defaults consist of criteria that have a material effect on the nature of what kind of information a particular outlet is incentivized to produce. Such defaults include (but are not limited to) the country of origin of the media outlet and where that country ranks in non-partisan press freedom indices; the nature of the media outlet's ownership; the quality of press competitiveness where the outlet operates; how many editorial staff members an outlet has; years of operation; and whether the reporting produced by the outlet is original, such as a wire service or international outlet, versus a secondary purveyor, which uses bots or humans to cut and paste originally reported information from elsewhere.

In some embodiments, the MOR may also factor into account a number of demonstrably false or inaccurate statements presented as fact or true by the media outlet (where evidence was available as to the falsity or inaccuracy at the time of publication), a number of incomplete (and therefore misleading) statements made without available context, a number of corrections, and conversely, a number of false/inaccurate or incomplete/misleading statements that are allowed to go uncorrected and for what periods of time. Over time, a number of news items published by the media outlet may be evaluated to identify a number of false, inaccurate, or misleadingly incomplete statements are present in such published items. Such numbers may further be tracked in comparison to a total number of items or statements, as well as over defined time periods, and factored into the MOR score assigned to the media outlet. For example, a media outlet that publishes a news item containing demonstrably false statements may see a shift in its MOR towards a higher likelihood of falsity.

The reliability of the individual journalist is given a Journalist Reliability (JR) Score. The JR score is determined by assessing the reliability of the individual journalist or the producer behind the news item. In some cases, this information may not be available, since a bot-produced article or a media outlet that does not use bylines (like The Economist) will not contain this data. However, in cases where this data is unavailable, an imputed measurement is substituted both in the case of non-human-produced media, as well as in the case of media outlets that do not identify their journalists. The content produced by each journalist may be evaluated according to similar metrics and factors as for the media outlets. In addition to factual representations, predictions and analyses may also be evaluated in retrospect for how true or well such predictions or analyses have born out by the facts. As such, the Journalist Reliability Score may not just reflect factual truths or falsities, such score may also reflect reliability of their analyses and prescience of their predictions.

The propensity of the item's content to be compromised is given is an Article Propensity (AP) Score. The AP score is combined with the MOR and JR Scores to establish the Veracity Index Number (VIN). Some types of content are more prone to veracity problems than others. Politics and celebrity news are two examples of information categories that are targeted more often for distortion than other less contentious subject matter categories. Hot button topics require greater scrutiny with regards to the potential for manipulation. Common topics may be based on common keywords, common individuals, companies, or institutions. This score assesses the degree to which that manipulation will occur. Such a score may also be evaluated based on consideration of similar metrics and factors as for media outlets and journalists.

Scores may also be applied to legacy articles and content produced by the respective media outlets, journalists, and content subject matter. As such, the MOR, JR, and AP—and therefore veracity index numbers—may be evaluated for defined periods of time, as well as changes over time as the respective owners, editors, journalists, advertisers, government regimes, and audiences change. For example, veracity index numbers may be determined by decade, by year, by a set of years, etc. As such, a certain media outlet may have a high MOR for one period of time, but may exhibit a much lower MOR for another period of time. In some instances, a media outlet may be more reliable for some topics, but not others. As such, more granular MOR scores may be identified or have its algorithms weighted based on the specific characteristics of the news item being evaluated.

The system generates the VIN score taking together the MOR, JR and AP Scores, which provides a user an objective metric in real-time that allows them to judge how confident or wary they should be of the quality of the information in the content item. Such a score may further be associated with visual indicators (e.g., bright red for high likelihood of falsity, light red for moderate likelihood of falsity, white or yellow for equal likelihoods of truth and falsity, light green for moderate likelihood of truth, and bright green for high likelihood of truth. Such a system may be implemented by a website, by a browser (e.g., plug-in), or operating system application.

The VIN score can still be further improved. Information and the providers of the news are in constant flux. For the VIN to be a more useful tool, it can be constantly analyzed and technically evaluated to ensure that the algorithm and default requirements are appropriate. This is why a second phase of a forensic analysis, running as a parallel track to the ongoing VIN scoring, is helpful: a technical evaluation by which the machine model running the VIN algorithm gets checked for its own veracity.

For each of these analyses, the system relies on a nuanced rating mechanism where the value of each opinion is weighted based on the reviewers expected and ultimately proven reliability within the sphere of each topic.

A group of subject matter expert reviewers can form the initial participants from which the data informing default requirements of the VIN's score are determined and gathered. They are the starting point from which the machine model behind the VIN "learns," since they may build and their subsequent input used to refine the initial corpus of data. Reputation (and associated likelihood of veracity) depends on the field of review. For example, a journalist with a medical degree is presumed to know more about a viral outbreak than one with an architecture degree. An economist is presumed to know more about the economy than a baseball player. With each profession, however, different levels of credentials may apply. A medical doctor with multiple graduate degrees, fellowships, and residencies at reputable universities and hospitals, and who has conducted clinical medical research and authored peer-reviewed articles is presumed to know more about medicine than a self-certified, self-referring individual without the generally accepted credentials of a board-certified medical doctor.

A respected newspaper with a large staff of journalists is presumed to apply more rigorous standards for accuracy regarding international affairs than a local small town newspaper with a staff of 3. These may be starting assumptions that will be adjusted over time as the system obtains more data and learns from the same. Alternatively, a starting data set may be built based on analyses for a representative sample of legacy—whether recent or older—news items. For example, past news items published by such newspapers may be analyzed for their rigor in publishing statements that are supported by the available and subsequently available evidence. Such analyses may be initially performed by a set of expert reviewers, and initial base scores determined therefrom.

The system may initially restrict the initial reviewers to people who are known to be experts in the topic at issue, eliminating the noise of anonymous opinions (and the headache of people who try to game the system). Once the system has a group of reviewers, the system may analyze the VIN over time: for example, if a contingent of reviewers accurately predicts changes in the Japanese yen over a number of months, their accuracy on that topic may be judged statistically significant to the extent that it can be used to assess their weighting when creating MOR, JR and AP scores for news items on the economy. This "accurate contingent" and all "accurate contingents" (there may be thousands) is created dynamically from those reviewers who have shown accuracy—those who stop showing accuracy may be weeded out over time as their respective score begin to reflect the same. Some reviewers will be in multiple contingents.

The system will transparently ensure that the members of the crowd are as unbiased and as objective as possible. Most of this will happen automatically as the more accurate reviewers rise in rankings—under the presumption that more accurate reviewers will be less prone to bias. To help achieve algorithmic accountability, the crowd's results must also be vetted for the kinds of objective traits that distinguish the least partisan and most objective types of reviews. To do this, the system includes algorithms to establish objectivity scores for reviewers. In addition to the historical track record scoring of crowd-member reviewers, they should be assessed along several default traits that have been scientifically shown to yield the least conflictual capacities. These traits include a propensity to "actively open-minded thinking" (AOMT), cognitive closure, need for cognition, verbal intelligence aptitude, pattern recognition capability, and cognitive reflection.

There are a few ways to determine the AOMT of reviewers. In general, the assessment of the reviewers is a test of their aptitude to support and analyze the VIN with the least amount of subjectivity possible.

A first example includes those people who have been previously evaluated (for example, known superforecasters who have worked with Intelligence Advanced Research Projects Activity (IARPA)). IARPA is an organization within the Office of the Director of National Intelligence responsible for leading research to overcome difficult challenges relevant to the United States Intelligence Community. Experts who are highly credentialed from established universities and institutions and whose work have been peer-reviewed may similarly be considered reliable sources, as well as reliable reviewers of others' work.

A second example includes those people who have filled out surveys or tests that yield a strong likelihood of this capability (to be given a higher expectation to be confirmed by their track record).

A third example includes those people for whom this capability is discovered by the deep learning systems based collaborative filtering, results comparisons and other factors like imputed intelligence and consumption behavior.

There are at least two additional considerations for the system to account for. The first consideration is privacy and confidentiality. If I am a subscriber to the LA Times, they know who I am but the overall system does not. There are mechanisms that can be used to anonymize users but the simplest mechanisms cannot be employed because the system can track the opinions of the reviewers across news sources while not exposing any of the publications to user information from their competitors or, for that matter, to any data that they have not explicitly been given permission to see. Though there is less risk (and harm) in using algorithms to determine who someone is by reverse engineering from their data than say in the medical space, still it is best to limit these kinds of data attacks.

The second consideration has broad implications across deep learning approaches in general. Because sophisticated AI systems learn on their own, they are not, per se, programmable. If one wants a system to optimize on, say, which approach generates the highest ad revenue, it can be compared with results from a similar set of users and the approach that generates the highest revenue per user can be presumed to be a better choice. Within the context of news, admins will not always have objectively preferred outcomes and so the admins must have mechanisms to determine what kind of policy choices the system is making and have a panel of policy experts (for example, approved, balanced, or superforecasters) review the imputed policy decisions the system is making and determine its impartiality. This also implies that the system must be able to be changed to reflect the more unbiased approach.

As a corollary to the two considerations above is the issue of accountability and retrospective analysis. Possibly, some of the same mechanisms used to solve the second consideration above can be used to provide accountability and forensic analysis. Nonetheless, the systems must be built with forensic hooks that can be used for such appraisals.

The AI Systems determine and refine weightings over time. The MOR, JR, AP and RA initial weightings may be initially based in large part on input from experts in the field. The AI systems continuously analyzes new content against the learning set, identifies new data to add to the learning set, and refines the weightings as such data become available. The areas of refinement include: Article Veracity Analysis, Collating and Weighting of Reviewers, Bias Analysis, and/or Forensic Accountability Analysis, etc.

Figure 2:
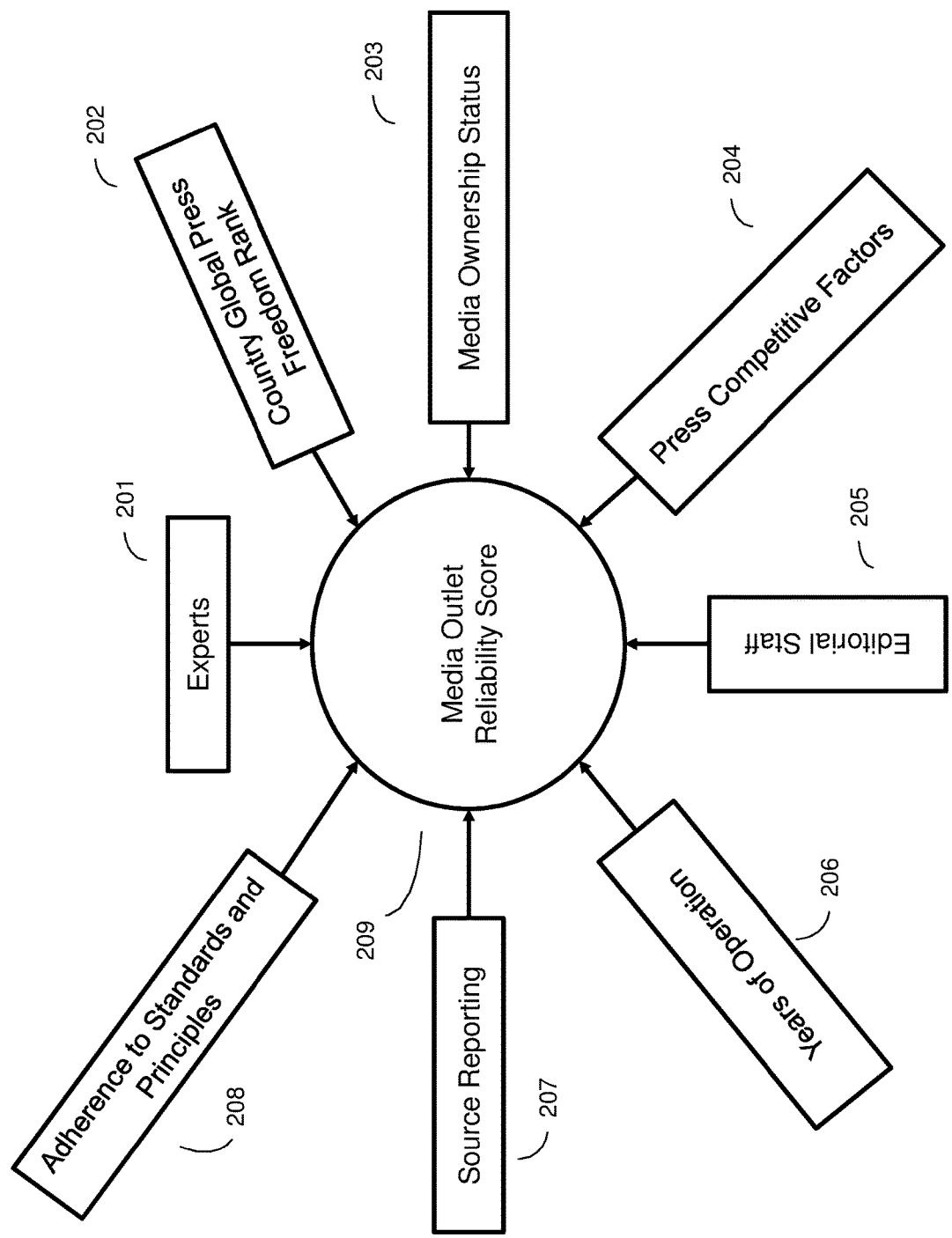
FIG. 2 illustrates a block diagram of an example architecture for determining a Media Outlet Reliability (MOR) Score.

FIG. 2 illustrates a block diagram of an example architecture for determining a Media Outlet Reliability (MOR) Score (209). As noted above, an initial base score may be generated and assigned based on input from a panel of experts (201) similar to peer review for academia, coaches polls for sports, and nonpartisan agencies for evidence-based research and forecasting. The MOR score may further be refined over time based on: current country of origin rank on annual global press freedom index (202) (could include multiple press freedom index rankings to refine weighting), media ownership status (203) (coded according to whether media ownership status is by a single individual, a for-profit consortium, a family, unidentified, etc.), press competitiveness factor (204) (determined by how many other competing media outlets exist at the media source's point of origin), total number of editorial staff (205), years of operation (206), source reporting (207) (is reporting original, secondary, automated or a known troll), and adherence to generally accepted principles and standards for journalism (208).

Figure 3:
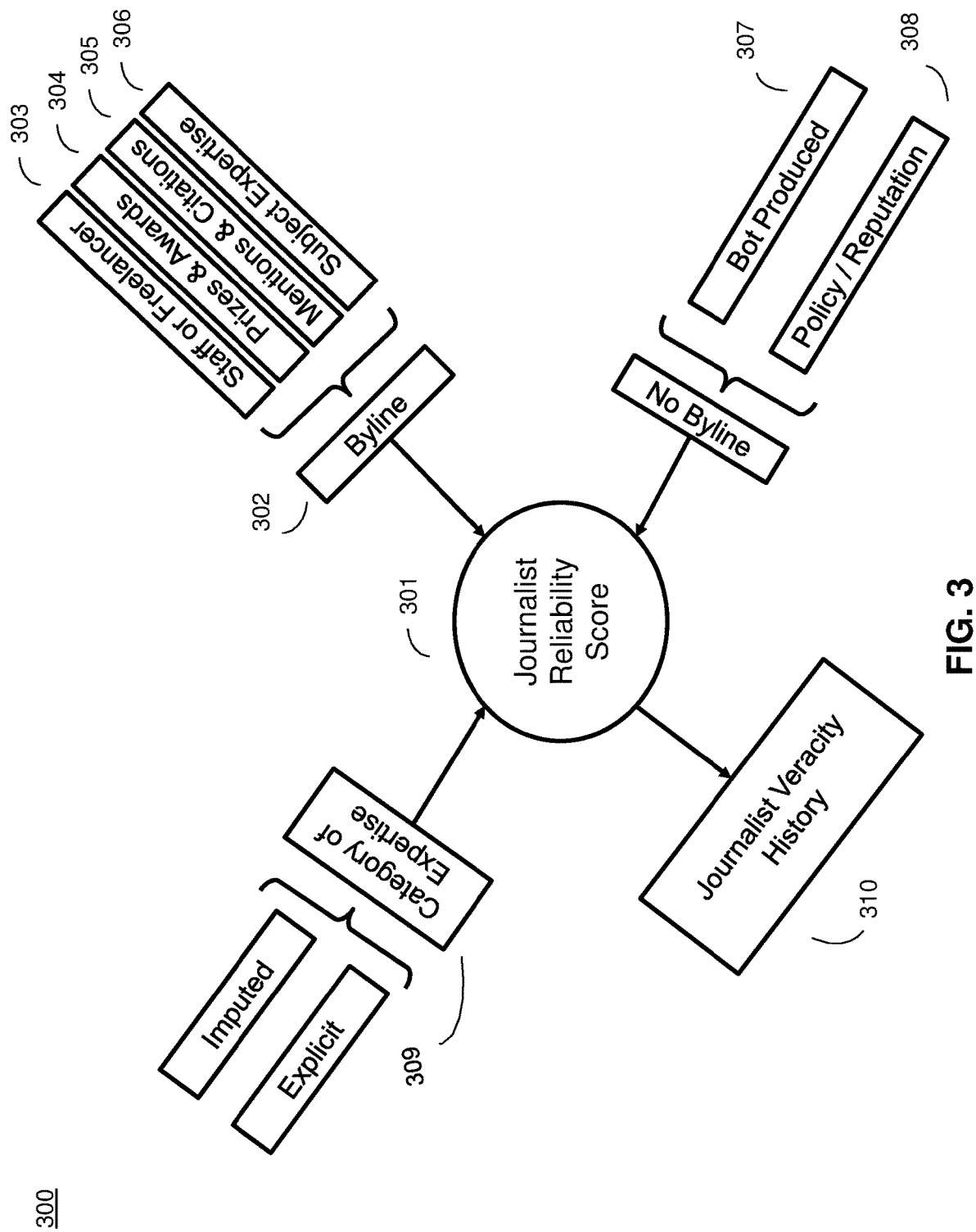
FIG. 3 illustrates a block diagram of an example architecture for determining a Journalist Reliability (JR) Score.

FIG. 3 illustrates a block diagram of an example architecture for determining a Journalist Reliability (JR) Score (301). JR score is generated based on the following factors: If a byline (302) for a journalist is available, rank and weighting are based on: status as a staff employee or freelancer (303), prizes, awards (304), mentions, citations (305), subject matter expertise (306) based on prior reporting and/or degrees/credentials. If a byline for the journalist is not available, rank and weighting are based on the Journalist Veracity History variable, which is assessed and ranked through two sub-categories: Was the story automated (bot-produced) (307), and/or Appearing in media that does not structurally use bylines (308). Areas of expertise which includes an Imputed Index of Expertise on a category by category basis (309) (categories TBD).

Journalist Veracity History (310) which includes a Cumulative Veracity History of the Journalist based on the reviews of that journalist for that area of expertise—all reviews weighted based on the expertise of the reviewers and their RA Scores. Similar to the MOR scores discussed above, an initial base score may be assigned based on a panel of experts and refined over time as new data (e.g., new news content items, including new articles, new videos, and new social media posts/sharing activity) is evaluated.

Figure 4:
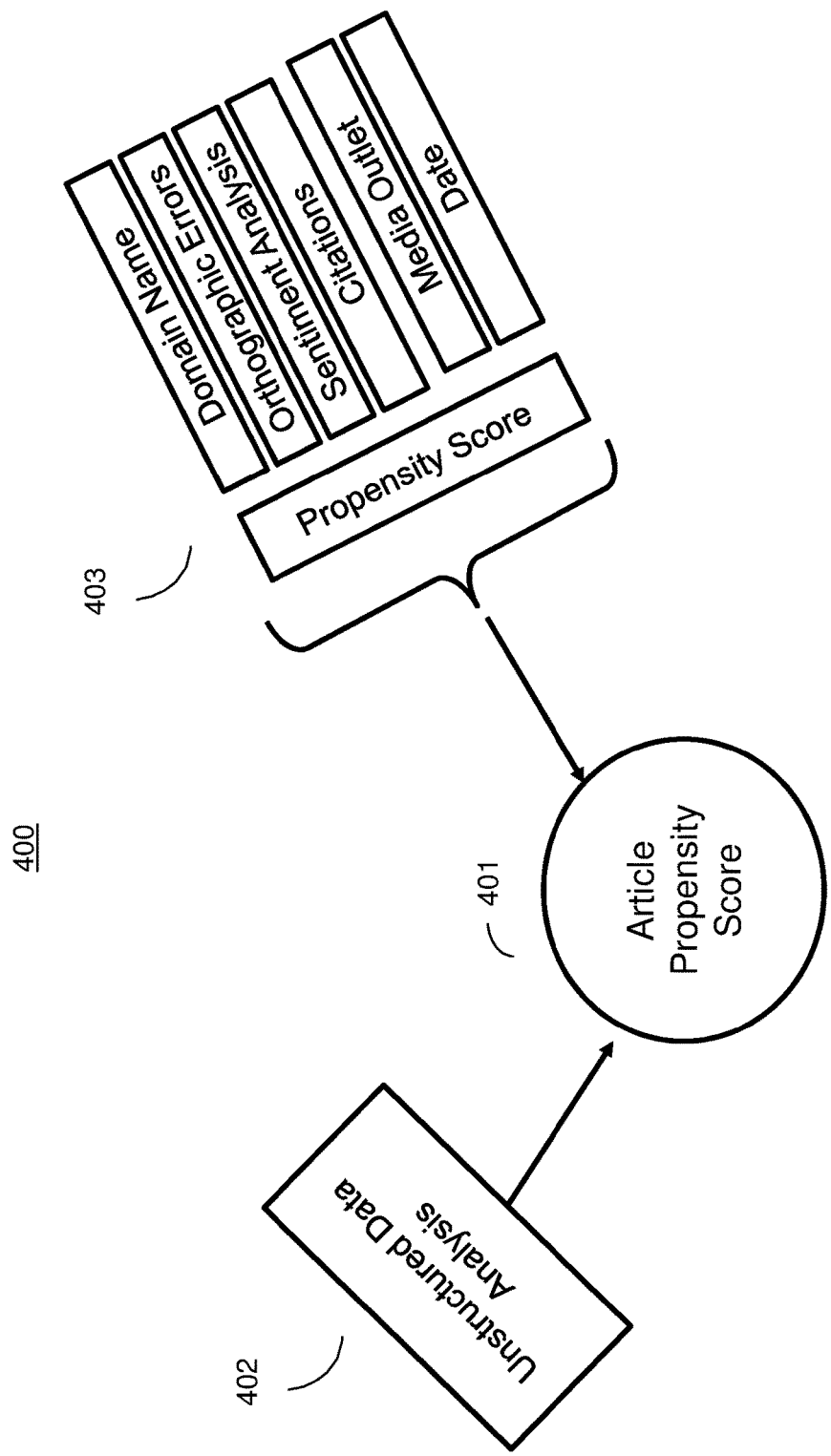
FIG. 4 illustrates a block diagram of an example architecture for determining an Article Propensity (AP) Score.

FIG. 4 illustrates a block diagram of an example architecture for determining an Article Propensity (401) (AP) Score. The AP score is determined by Article Analysis (402) (unstructured data analysis) and a Propensity Score (403). The propensity score is based on the following factors:

Objective subject matter category (based on keyword metadata found in the headline and body copy), Domain name: down-weighting results from sites that are variations of true media outlet names; types, like Wordpress, etc., Number of orthographic errors within the content, AP-style (or other established publishing style-book standards) grammar, Sentiment analysis to rate level of emotional language versus neutral language, Citations for which down-weighting occurs if citations show an imbalanced use of citations from known disinformation purveyors, trolls, etc., Country of origin, Media Outlet category ID (how does the Media Outlet of the article identify the category), and Date (articles can be weighted according to time data; for example, political news around the time of an election will be weighted with greater sensitivity towards a manipulation factor, etc.).

Figure 5:
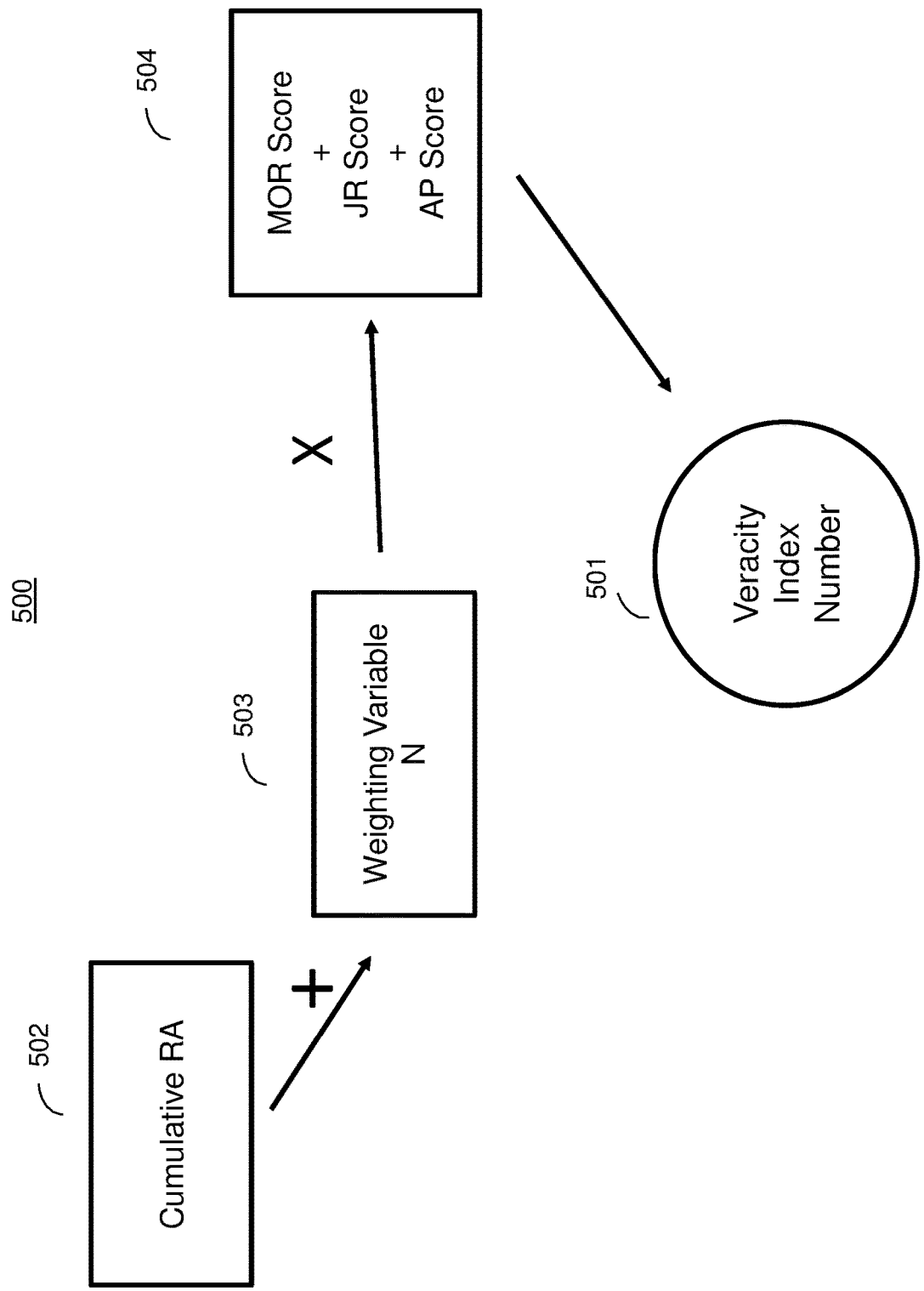
FIG. 5 illustrates a block diagram of an example architecture for determining a Veracity Index Number (VIN)

FIG. 5 illustrates a block diagram of an example architecture for determining a Veracity Index Number (501) (VIN). An example formula for determining the VIN: VIN= (Cumulative RA Scores of all reviewers) (502)+N (503)* (MOR Score+JR Score+AP Score) (504).

Initially, until there is sufficient data, the MOR Score will be weighted most heavily with N as a large value. As the system is informed by more data, the weighting will shift toward the RA Scores (that is N will become smaller) with JR Scores being weighted more heavily than MOR Scores.

Figure 6:
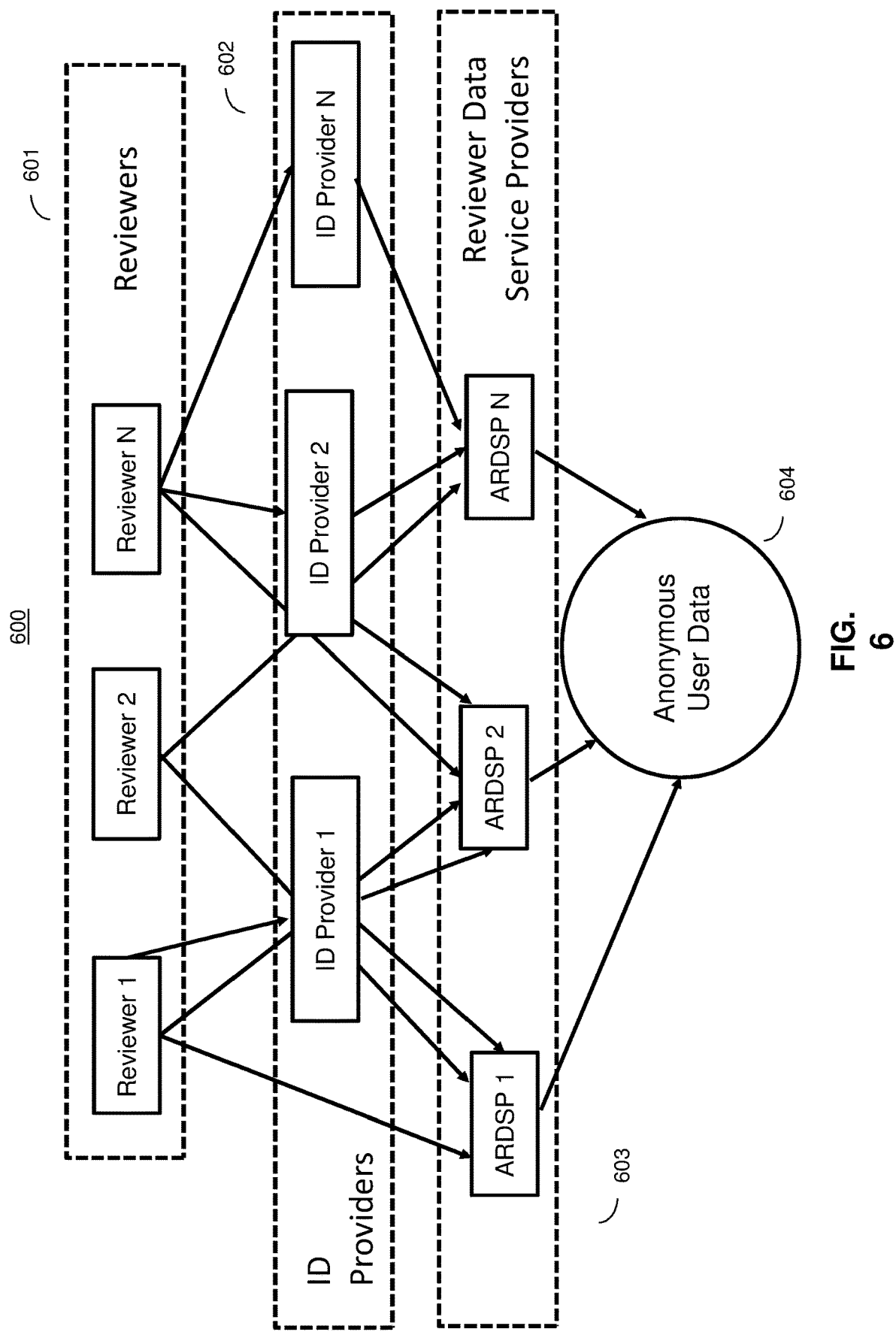
FIG. 6 illustrates a block diagram of an example architecture for determining reviewer identification and ratings.

FIG. 6 illustrates a block diagram of an example architecture for determining reviewer identification and ratings. ID Providers (602) have the identities of their registered reviewers (601) and maintain their privacy and confidentiality. Anonymized reviewer data can be shared with an Anonymous Reviewer Database Service Provider (ARDSP) (603) subject to reviewer opt-in and anonymizing protocols. An ARDSP is an entity that manages the reviewer data, makes it available in anonymous fashion and the engines that utilize the data for the purpose of generating Veracity Index Numbers.

One possible mechanism is to allow a user to log in to the ARDSP and then link their media account to an anonymous Reviewer Database (ARD). An ARD is an anonymized Database of Reviewers (users) stored in a common database (604) accessible by all licensees.

Then, at the second account Log in standardized ID federation mechanisms are use (like Facebook or Google). Work may need to be done to enable regular media ID providers (like Wall Street Journal or a University) to participate as the first anchor in a Federated ID system.

The ARDSP has one or more IDs for each reviewer: The same person may have IDs from multiple ID Providers, and/or a mechanism may be used to optionally enable a reviewer to collapse their identities into a single global ID not known to the ID Providers but known to the ARDSP.

Mechanisms to collect (via form or import) and verify user information data must be developed (i.e. education, career history, etc.) to optimize the analysis of the reviewers veracity (at least in the early phases).

Superforecasters can come in two flavors: Those that are pre-screened like in the IARPA tournaments, and those that are observed as accurate based on their reviewing accuracy.

Superforecasters that are pre-screened like in the IARPA tournaments: For that contingent of highly reputable reviewers we can use Individual Differences Screening to optimize the analysis of the reviewers by deriving their capacity to determine, weigh and assess the Veracity Index Number variables. This screening generates a score or rank (Individual Differences Screening Score (IDSS) that is regularly checked to ensure a threshold level of objectivity. The IDSS is generated by assessing individual reviewers across the following traits: Need for cognition, Active Open Minded Thinking (AOMT), Cognitive Reflection, Need for cognitive closure, Pattern recognition, Wechsler Verbal Intelligence, and Brier Score.

A Brier score is a proper score function that measures the accuracy of probabilistic predictions. It is applicable to tasks in which predictions must assign probabilities to a set of mutually exclusive discrete outcomes. The set of possible outcomes can be either binary or categorical in nature, and the probabilities assigned to this set of outcomes must sum to one, where each individual probability is in the range of 0 to 1.

Superforecasters that are observed as accurate based on their reviewing accuracy: By tracking the accuracy of the individual forecasts, an AI engine can impute the 7 factors above: Need for cognition, AOMT, Cognitive Reflection, Need for cognitive closure, Pattern recognition, Wechsler Verbal Intelligence and Brier Score and generate an IDDS Score.

Historical veracity for all Reviewers is tracked and their ratings are updated on a regular basis.

Lastly, the system performs collating of Reviewers.

FIG. 7 illustrates an example methodology for initiating events by social gestures.

FIG. 8 illustrates a block diagram of an example processing device 800. The processing device 800 can include a Basic Input/Output System (BIOS) 810, a memory 820, a storage 830, a network interface 840, a processor 850, a northbridge 860, a southbridge 870, and an input/output (IO) interface 880.

The processing device 800 can be any apparatus for processing data, such as for example, a server computer (e.g., one of many rack servers in a data center), a personal computer, a laptop computer, a smartphone, a tablet, an entertainment console, a wearable device, or a set top box. The processor (e.g., central processing unit (CPU)) 850 can be a chip on a motherboard that can retrieve and execute programming instructions stored in the memory 820. The processor 850 can be a single CPU with a single processing core, a single CPU with multiple processing cores, or multiple CPUs. One or more buses 890 can transmit instructions and application data between various computer components such as the processor 850, memory 820, storage 830, and networking interface 840.

The memory 820 can include any physical device used to temporarily or permanently store data or programs, such as various forms of random-access memory (RAM). The storage 830 can include any physical device for non-volatile data storage such as a HDD or a flash drive. The storage 830 can often have greater capacity than the memory 820 and can be more economical per unit of storage, but can also have slower data transfer rates.

The BIOS 810 can include a Basic Input/Output System or its successors or equivalents, such as an Extensible Firmware Interface (EFI) or Unified Extensible Firmware Interface (UEFI). The BIOS 810 can include a BIOS chip located on a motherboard of the processing device 800 storing a BIOS software program. The BIOS 810 can store firmware executed when the computer system is first powered on along with a set of configurations specified for the BIOS 810. The BIOS firmware and BIOS configurations can be stored in a non-volatile memory (e.g., NVRAM) 812 or a ROM such as flash memory. Flash memory is a non-volatile computer storage medium that can be electronically erased and reprogrammed.

The BIOS 810 can be loaded and executed as a sequence program each time the processing device 800 is started. The BIOS 810 can recognize, initialize, and test hardware present in a given computing system based on the set of configurations. The BIOS 810 can perform self-test, such as a Power-on-Self-Test (POST), on the processing device 800. This self-test can test functionality of various hardware components such as hard disk drives, optical reading devices, cooling devices, memory modules, expansion cards and the like. The BIOS can address and allocate an area in the memory 820 in to store an operating system. The BIOS 810 can then give control of the computer system to the OS.

The BIOS 810 of the processing device 800 can include a BIOS configuration that defines how the BIOS 810 controls various hardware components in the processing device 800. The BIOS configuration can determine the order in which the various hardware components in the processing device 800 are started. The BIOS 810 can provide an interface (e.g., BIOS setup utility) that allows a variety of different parameters to be set, which can be different from parameters in a BIOS default configuration. For example, a user (e.g., an administrator) can use the BIOS 810 to specify dock and bus speeds, specify what peripherals are attached to the computer system, specify monitoring of health (e.g., fan speeds and CPU temperature limits), and specify a variety of other parameters that affect overall performance and power usage of the computer system.

The network interface 840 connects the processing device 800 to a network 802. The network interface 350 is configured to transmit data to and from the network 802. The network 802 can include a wide area network (WAN) such as the Internet, or a local area network (LAN). The network 802 can include an intranet, a storage area network (SAN), a personal area network (PAN), a metropolitan area network (MAN), a wireless local area network (WLAN), a virtual private network (VPN), a cellular or other mobile communication network, a wireless local area networking (WiFi) network, a BLUETOOTH® wireless technology connection, a near field communication (NFC) connection, any combination thereof, and any other appropriate architecture or system that facilitates the communication of signals, data, and/or messages.

The I/O interface 880 allows the processing device 800 to connect with I/O devices such as a keyboard, a mouse, a remote control, a controller, a microphone, a television, a head mounted display (HMD), and/or a monitor, etc.

The northbridge 860 can be a chip on the motherboard that can be directly connected to the processor 850 or can be integrated into the processor 850. In some instances, the northbridge 860 and the southbridge 870 can be combined into a single die. The northbridge 860 and the southbridge 870, manage communications between the processor 850 and other parts of the motherboard. The northbridge 860 can manage tasks that require higher performance than the southbridge 870. The northbridge 860 can manage communications between the processor 850, the memory 820, and video controllers (not shown). In some instances, the northbridge 860 can include a video controller.

The southbridge 870 can be a chip on the motherboard connected to the northbridge 860, but unlike the northbridge 860, is not directly connected to the processor 850. The southbridge 870 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing device 800. The southbridge 870 can be connected to or can include within the southbridge 870 the I/O interface 870, Direct Memory Access (DMAs) controllers, Programmable Interrupt Controllers (PICs), and a real-time dock.

One or more input devices 806 can connect to the processing device 800. The input device 806 can also be integrated into the processing device 800. The input device 806 can be at least one of a game controller, a joystick, a mouse, a keyboard, a touchscreen, a trackpad, or other similar control device. The input device 806 allows a user to provide input data to the processing device 800.

One or more display devices 804 can connect to the processing device 800. The display device 804 can also be integrated into the processing device 800. The display device 804 can be at least one of a monitor, a light-emitting display (LED) screen, a liquid crystal display (LCD) screen, a head mounted display (HMD), a virtual reality (VR) display, a augmented reality (AR) display, or other such output device. The display device 804 allows the processing device 800 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method for marking falsities in online statements, the method comprising:
    storing a machine modeled learning dataset for artificial intelligence in memory, the machine modeled learning dataset associated with identification of one or more rhetorical devices in a statement and applicable by the artificial intelligence for identifying the falsities in an online viral content in real-time;
    accessing online data over a communication network regarding a plurality of different online statements that have been published or republished on one or more websites, the online statements including the one or more rhetorical devices;
    automatically repeating analyses of the online data to identify recency of the online data regarding the rhetorical devices in the online statements based on the stored machine modeled learning dataset and natural language processing, wherein the analyses include identifying a subset of the online statements as including one or more falsities based on one or more applications of the learning dataset,
    automatically assign one or more current scores to the websites, based on a criteria, wherein current weighting of the one or more scores associated with the learning dataset is adjusted based on the recency of the online data; and
    generating, based on the adjusted current weighting of the one or more scores, a customized content display of the websites that published and the websites that have republished the online statements, wherein the customized content display is provided to a user device and includes one or more visual indicators of the identified falsities within the online statements published or republished by the websites, wherein one or more types of the visual indicators are customized based on preferences of a user of the user device.

2. The method of claim 1, wherein the machine modeled learning dataset includes data regarding a journalist authoring the statements.

3. The method of claim 1, further comprising generating a reliability score for a journalist of the online statements based on a background of the journalist.

4. The method of claim 1, further comprising generating one or more reliability scores for one or more media providers of the online statements based on a propensity for a type of content for each media provider of the media providers during a specified time to be compromised.

5. The method of claim 4, further comprising refining the reliability scores over time based on ownership of one or more of the media providers.

6. The method of claim 4, further comprising refining the reliability scores over time based on editors of one or more of the media providers.

7. The method of claim 4, further comprising refining the reliability scores over time based on governmental regimes under which one or more of the media providers is operating.

8. The method of claim 4, further comprising refining the reliability scores over time based on one or more advertisers advertising in one or more of the media providers.

9. The method of claim 4, wherein the reliability scores are is further based on whether proof of the falsities is available.

10. The method of claim 4, wherein the reliability scores are further based on a context of the falsities in the online statements.

11. The method of claim 4, wherein the reliability scores are further based on whether the falsities in the online statements were later corrected.

12. The method of claim 4, wherein the reliability scores are further based on a number of the falsities in the online statements.

13. The method of claim 1, wherein the one or more websites correspond to online platforms that include a wire service.

14. The method of claim 1, wherein the one or more websites correspond to online platforms that include a social media outlet.

15. The method of claim 1, wherein the one or more websites correspond to online platforms that include a traditional media outlet.

16. The method of claim 1, wherein the one or more websites correspond to online platforms that include a blog.

17. The method of claim 1, wherein the identified falsities are text based.

18. The method of claim 1, wherein the identified falsities are video based.

19. The method of claim 1, wherein the identified falsities are still image based.

20. The method of claim 1, wherein the weighting is further based on historical variables.

21. The method of claim 1, wherein the weighting is further based on a byline.

22. The method of claim 1, wherein the weighting is further based on an employment status of a journalist.

23. The method of claim 1, wherein the weighting is further based on citations of a journalist.

24. The method of claim 1, wherein the weighting is further based on recognitions of a journalist.

25. A non-transitory computer-readable storage medium having embodied thereon instructions executable by a processor to perform a method of marking falsities in online news, the method comprising:
    storing a machine modeled learning dataset for artificial intelligence in memory, the machine modeled learning dataset associated with identification of one or more rhetorical devices in a statement and applicable by the artificial intelligence for identifying the falsities in an online viral content in real-time;
    accessing online data over a communication network regarding a plurality of different online statements that have been published or republished on one or more websites, the statements including one or more rhetorical devices;
    automatically repeating analyses of the online data to identify recency of the online data regarding the rhetorical devices in the online statements based on the stored machine modeled learning dataset and natural language processing, wherein the analyses include identifying a subset of online statements as including one or more falsities based on one or more applications of the learning dataset, automatically assign, based on a criteria, one or more current scores to the websites, wherein current weighting of the one or more scores associated with the learning dataset is adjusted based on the recency of the online data; and generating, based on the adjusted current weighting of the one or more scores, a customized content display of websites that published and the websites that have republished the online statements, wherein the customized content display is provided to a user device and includes one or more visual indicators of the identified falsities within the online statements published or republished by the websites, wherein one or more types of the visual indicators are customized based on preferences of a user of the user device.

26. A system for determining veracity of online content, the system comprising:

a database in memory that stores criteria that include one or more standards for information distribution associated with a plurality of media outlets, a plurality of journalists, and a plurality of predefined topics;

a communication interface that accesses a website that includes website content over a communication network, the website content including a plurality of statements; and a processor that executes instructions stored in memory, wherein execution of the instructions by the processor to:

automatically assign and update one or more current scores to the website content based on the stored criteria, wherein the criteria are dynamically updated using artificial intelligence based on changing status of the plurality of media outlets and the plurality of journalists over time, the changing status associated with incentives of the plurality of media outlets and the plurality of journalists received from one or more third party sources;

generate a veracity score for each statement of the statements based on the updated current scores, wherein the veracity score is dynamically weighted based on recency of change in the status;

identify that the generated veracity score falls into a predefined category related to a veracity indicator; and filter the website content using artificial intelligence to identify one or more statements as falsities; and modify the website content within a display customized for a user device based on the dynamically weighted veracity scores and preferences of a user of the user device, wherein the customized display further includes the veracity indicator, wherein the modifying the website content includes annotating the falsities within the customized display in accordance with a preferred type of annotation specified by the preferences, and wherein the identified statements is annotated with a verified statement from a different source.

27. The system of claim 26, wherein the processor further identifies that the generated veracity score falls into a predefined category associated with a veracity indicator, and wherein the customized display further includes the associated veracity indicator.

28. The system of claim 26, wherein the website content includes legacy content associated with an associated media outlet, journalist, and predefined topic.

29. The system of claim 26, wherein the database further stores the current score for an associated media outlet, journalist, and at least one predefined topic.

30. A method for determining veracity of online content, the method comprising:

storing criteria in a database in memory, the criteria including one or more standards for information distribution associated with a plurality of media outlets, a plurality of journalists, and a plurality of predefined topics;

accessing a website that includes website content over a communication network, the website content including a plurality of statements;

automatically assigning and updating one or more current scores to the website content based on the stored criteria, wherein the criteria are dynamically updated using artificial intelligence based on changing status of the plurality of media outlets and the plurality of journalists over time, the changing status associated with incentives of the plurality of media outlets and the plurality of journalists received from one or more third party sources;

generating a veracity score for each statement of the statements based on the updated current scores, wherein the veracity score is dynamically weighted based on recency of change in the status; and filtering the website content using artificial intelligence to identify one or more statements as falsities;

identifying that the generated veracity score falls into a predefined category related to a veracity indicator; and modifying the website content within a display customized for a user device based on the dynamically weighted veracity scores and preferences of a user of the user device, wherein the customized display further includes the veracity indicator, wherein the modifying the website content includes annotating the falsities within the customized display in accordance with a preferred type of annotation specified by the preferences, and wherein the identified statements is annotated with a verified statement from a different source.

31. The method of claim 30, wherein the website content includes legacy content associated with an associated media outlet, journalist, and predefined topic.

32. The method of claim 30, further comprising storing the current score for an associated media outlet, journalist, and at least one predefined topic.

33. A non-transitory computer-readable storage medium, having embodied thereon a program executable by a processor to perform a method for determining veracity of online content, the method comprising:

storing criteria in a database in memory, the criteria including one or more standards for information distribution associated with a plurality of media outlets, a plurality of journalists, and a plurality of predefined topics;

accessing a website that includes website content over a communication network, the website content including a plurality of statements;

automatically assigning and updating one or more current scores to the website content based on the stored criteria, wherein the criteria are dynamically updated using artificial intelligence based on changing status of the plurality of media outlets and the plurality of journalists over time, the status associated with incentives of the plurality of media outlets and the plurality of journalists received from one or more third party sources;

generating a veracity score for each statement of the statements based on the updated current scores, wherein the veracity score is dynamically weighted based on recency of change in the status;

filtering the website content using artificial intelligence to identify one or more statements as falsities;

identifying that the generated veracity score falls into a predefined category related to a veracity indicator; and modifying the website content within a display customized for a user device based on the dynamically weighted veracity scores and preferences of a user of the user device, wherein the customized display further includes the veracity indicator wherein the modifying the website content includes annotating the falsities within the customized display in accordance with a preferred type of annotation specified by the preferences, and wherein the identified statements is annotated with a verified statement from a different source.

* * * * *